US012467108B2

(12) United States Patent
Im et al.

(10) Patent No.: US 12,467,108 B2
(45) **Date of Patent: *Nov. 11, 2025**

(54) HIGH-STRENGTH STEEL SHEET AND MANUFACTURING METHOD THEREOF

(71) Applicant: POSCO, Pohang-si (KR)

(72) Inventors: Young-Roc Im, Gwangyang-si (KR); Man-Young Park, Gwangyang-si (KR); Jong-Chan Park, Gwangyang-si (KR); Eul-Yong Choi, Gwangyang-si (KR); Min-Seo Koo, Gwangyang-si (KR); Jong-Kweon Kim, Gwangyang-si (KR); Jae-Hoon Lee, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 760 days.

This patent is subject to a terminal disclaimer.

(21) Appl. No.: 17/625,625

(22) PCT Filed: Jul. 20, 2020

(86) PCT No.: PCT/KR2020/009548

§ 371 (c)(1),
(2) Date: Jan. 7, 2022

(87) PCT Pub. No.: WO2021/020787

PCT Pub. Date: Feb. 4, 2021

(65) Prior Publication Data

US 2022/0259691 A1 Aug. 18, 2022

(30) Foreign Application Priority Data

Jul. 29, 2019 (KR) ........................ 10-2019-0091890
Dec. 18, 2019 (KR) ........................ 10-2019-0170277

(51) Int. Cl.

| | |
|---|---|
| ***C21D 9/46*** | (2006.01) |
| ***B32B 15/01*** | (2006.01) |
| ***C21D 6/00*** | (2006.01) |
| ***C21D 8/00*** | (2006.01) |
| ***C21D 8/02*** | (2006.01) |
| ***C22C 38/00*** | (2006.01) |

(Continued)

(52) U.S. Cl.

CPC .............. *C21D 9/46* (2013.01); *B32B 15/013* (2013.01); *C21D 6/004* (2013.01); *C21D 6/005* (2013.01); *C21D 6/008* (2013.01); *C21D 8/005* (2013.01); *C21D 8/0226* (2013.01); *C21D 8/0236* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C21D 2211/001* (2013.01); *C21D 2211/008* (2013.01)

(58) Field of Classification Search

CPC ... C21D 1/19; C21D 1/25; C21D 1/26; C21D 2211/001; C21D 2211/002; C21D 2211/003; C21D 2211/008; C21D 6/004; C21D 6/005; C21D 6/008; C21D 8/005; C21D 8/0205; C21D 8/0226; C21D 8/0236; C21D 8/0542; C21D 8/0273; C22C 38/001; C22C 38/002; C22C 38/02; C22C 38/06; C22C 38/20; C22C 38/22; C22C 38/24; C22C 38/28; C22C 38/32; C22C 38/38; C22C 38/40; C22C 38/42; C22C 38/44; C22C 38/46; C22C 38/48; C22C 38/50; C22C 38/54; C22C 38/58

See application file for complete search history.

(56) References Cited

U.S. PATENT DOCUMENTS

2008/0283154 A1 11/2008 Taniguchi et al.
2011/0048589 A1 3/2011 Matsuda et al.

(Continued)

FOREIGN PATENT DOCUMENTS

JP 2007070659 3/2007
JP 2007177272 7/2007

(Continued)

OTHER PUBLICATIONS

European Search Report—European Application No. 20847714.1 issued on Aug. 9, 2022, citing WO 2019/124693, US 2017/0096723, WO 2017/109541, and US 2011/0048589.
Japanese Office Action—Japanese Application No. 2022-501211 issued on Feb. 28, 2023, citing JP 2007-177272, WO 2009/099079, and WO 2017/138384.
International Search Report—PCT/KR2020/009548 dated Oct. 27, 2020.

*Primary Examiner* — Lois L Zheng
(74) *Attorney, Agent, or Firm* — CANTOR COLBURN LLP

(57) ABSTRACT

Provided are a high-strength steel sheet and a method for manufacturing same, the high-strength steel sheet including: an alloy system having C, Si, Mn, Cr, Al, Nb, Ti, B, P, S, N, and the remainder of Fe and other inevitable impurities. The contents of C, Si, and Al satisfy equation (1) below. The microstructure includes, by an area fraction, greater than 50% to 70% or less of tempered martensite, and the remainder of residual austenite, fresh martensite, ferrite, and bainite, in which a cementite phase as a second phase is precipitated and distributed in an area fraction of 1-3% between bainite laths, or at a lath on the tempered martensite or grain boundaries. [Equation (1)][C]+([Si]+[Al])/5; 0.35 wt. % (wherein [C], [Si], and [Al] denote wt % of C, Si, and Al, respectively.)

13 Claims, No Drawings

(51) Int. Cl.

| | |
|---|---|
| ***C22C 38/02*** | (2006.01) |
| ***C22C 38/06*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/54*** | (2006.01) |
| ***C22C 38/58*** | (2006.01) |

(56) References Cited

U.S. PATENT DOCUMENTS

2017/0096723 A1 4/2017 Kasuya et al.
2017/0321297 A1 11/2017 Takashima et al.
2018/0127856 A1 5/2018 Takashima et al.
2018/0355453 A1 12/2018 Seo
2020/0024709 A1 * 1/2020 Yokoyama ............... C21D 1/20
2020/0230918 A1 7/2020 Morishita et al.

FOREIGN PATENT DOCUMENTS

JP 6252715 B1 * 12/2017 ............... C21D 1/19
KR 20060103480 9/2006
KR 20120074798 7/2012
KR 20140083286 7/2014
KR 101736620 5/2017
KR 20170075796 7/2017
WO 2009099079 8/2009
WO 2016135794 9/2016
WO 2017109541 6/2017
WO 2017138384 8/2017
WO 2018096090 5/2018
WO 2019026116 2/2019
WO 2019124693 6/2019

* cited by examiner

HIGH-STRENGTH STEEL SHEET AND MANUFACTURING METHOD THEREOF

TECHNICAL FIELD

The present disclosure relates to a high-strength steel sheet having hole expandability and a manufacturing method thereof.

BACKGROUND ART

In recent years, development of a technology of manufacturing a steel sheet having high strength has been promoted to reduce the weight of automobiles. A steel sheet having both high strength and formability may increase productivity, so it is excellent in terms of economy and is more advantageous in terms of safety of final parts. In particular, demand for steel having high tensile strength (TS) of 1180 MPa or higher has increased because a steel sheet having high tensile strength (TS) has a high bearing load until fracture occurs. In the related art, many attempts have been made to improve strength of the existing steel, but it was found that simple improvement of the strength degrades ductility and hole expansion ratio (HER).

Meanwhile, transformation induced plasticity (TRIP) steel sheet in which a large amount of Si or Al is added may be a related art which overcomes the aforementioned shortcomings. However, in the case of a TRIP steel sheet, it is possible to obtain elongation of 14% or more at TS 1180 MPa class but liquid metal embrittlement (LME) resistance may be deteriorated due to the addition of a large amount of Si and Al, which leads to poor weldability, and thus, commercialization of TRIP steel sheet as a material for automobile structures is limited.

In addition, various yield ratios are pursued in the same tensile strength class according to usages and purposes, and it is not easy to produce a steel having a high hole expansion ratio with a steel sheet having a low yield ratio. The reason is because it is usually necessary to introduce a martensite or ferrite phase as a second phase to lower a yield ratio but such a structural characteristics is a factor that impairs the hole expansion ratio.

Patent document 1 discloses a high-strength cold rolled steel sheet having yield ratio, strength, hole expansion ratio, delayed fracture resistance characteristics and having a high elongation of 17.5% or more. However, Patent document 1 has a disadvantage in that weldability is poor due to an occurrence of LME due to a high Si addition.

Related Art Document (Patent document 1) Korean Patent Laid-open Publication No. 2017-7015003

DISCLOSURE

Technical Problem

An aspect of the present disclosure may provide a high-strength steel sheet having an appropriate elongation for machining, high hole expandability and good weldability, while supporting high strength and low yield ratio, and a manufacturing method thereof.

The object of the present disclosure is not limited to the above. Those of ordinary skill in the art to which the present disclosure pertains will have no difficulty in understanding the additional subject matter of the present disclosure from the general description of the present disclosure.

Technical Solution

According to an aspect of the present disclosure, a high-strength steel sheet may include, by weight percent (wt %), 0.12% to less than 0.17% of carbon (C), 0.3% to 0.8% of silicon (Si), 2.5% to 3.0% of manganese (Mn), 0.4% to 1.1% of chromium (Cr), 0.01% to 0.3% of aluminum (Al), 0.01% to 0.03% of niobium (Nb), 0.01% to 0.03% of titanium (Ti), 0.001% to 0.003% of boron (B), 0.04% or less of phosphorus (P), 0.01% or less of sulfur (S): 0.01% or less of nitrogen (N), and a balance of iron (Fe) and inevitable impurities, wherein the contents of C, Si, and Al satisfy mathematical equation (1) below, a microstructure of the high-strength steel sheet includes, by area fraction, more than 50% to 70% or less of tempered martensite and remaining retained austenite, fresh martensite, ferrite and bainite, and wherein a cementite phase as a second phase may be precipitated and distributed in an area fraction of 1% or more and 3% or less between the bainite laths or at the laths or grain boundaries of the tempered martensite phase.

$$[C] + ([Si] + [Al])/5 \leq 0.35 \text{ wt. \%} \quad \text{[Equation (1)]}$$

(Here, [C], [Si], [Al] refer to the wt % of C, Si, and Al, respectively.)

The high-strength steel sheet contains more than 1% and less than 4% of the retained austenite, more than 10% and less than 20% of the fresh martensite, and more than 0% of the ferrite to less than 5%, and the balance may be bainite.

When the micro Vickers hardness test is performed, a difference between a 25%-th hardness value and a 75%-th hardness value may be distributed in a range between 100 and 150.

The high-strength steel sheet may further include, by wt %, one or more of 0.1% or less of copper (Cu), 0.1% or less of nitrogen (Ni), 0.3% or less of molybdenum (Mo), and 0.03% or less of vanadium (V)

The high-strength steel sheet may have a tensile strength of 1180 MPa or more, a yield strength of 740 MPa to 980 MPa, a yield ratio of 0.65 to 0.85, a hole expansion ratio (HER) of 25% or more, and an elongation of 7 to 14%.

The high-strength steel sheet may be a cold rolled steel sheet.

A hot-dip galvanized layer may be formed on at least one surface of the steel sheet.

An alloying hot-dip galvanized layer may be formed on at least one surface of the steel sheet.

According to an aspect of the present disclosure, a method of manufacturing a high-strength steel sheet may include preparing a slab and heating the slab to a temperature range of 1150 to 1250° C., the slab comprising, by wt %, 0.12% to less than 0.17% of carbon (C), 0.3% to 0.8% of silicon (Si), 2.5% to 3.0% of manganese (Mn), 0.4% to 1.1% of chromium (Cr), 0.01% to 0.3% of aluminum (Al), 0.01% to 0.03% of niobium (Nb), 0.01% to 0.03% of titanium (Ti), 0.001% to 0.003% of boron (B), 0.04% or less of phosphorus (P), 0.01% or less of sulfur (S): 0.01% or less of nitrogen (N), and a balance of iron (Fe) and inevitable impurities, wherein the contents of C, Si, and Al satisfy Equation 1 below; reheating the slab to a temperature range of 1150° C. to 1250° C.; finish hot rolling the reheated slab within a temperature range of finish delivery temperature (FDT) of 900° C. to 980° C.; cooling the slab at an average cooling rate of 10° C./see to 100° C./see after the finish hot rolling; coiling the slab in a temperature range of 500° C. to 700° C.; cold rolling the slab at a cold-rolling reduction ratio of 30% to 60% to obtain a cold rolled steel sheet; continuously annealing the cold rolled steel sheet in a temperature range of (Ac3+30° C.~Ac3+80° C.); primarily cooling the continuously annealed steel sheet at an average cooling rate of 10° C./s or less to a temperature range of 500° C. to 700° C. and secondarily cooling the steel sheet at an average cooling rate of 10° C./s or more to a temperature range of 280° C. to 380° C.; and reheating the cooled steel sheet at a temperature increase rate of 5° C./s or less to a temperature range of 380° C. to 480° C.

$$[C]+([Si]+[Al])/5 \leq 0.35 \text{ wt } \% \quad \text{[Equation (1)]}$$

(Here, [C], [Si] and [Al] refer to the wt % of C, Si and Al, respectively.)

The slab may further include, by wt %, 0.1% or less of copper (Cu), 0.1% or less of nickel (Ni), 0.3% or less of molybdenum (Mo), and 0.03% or less of vanadium (V).

The method may further include performing hot dip galvanizing at a temperature range of 480° C. to 540° C., after the reheating.

After the performing of the hot-dip galvanizing, an alloying heat treatment may be performed and cooling may be subsequently performed to room temperature.

After cooling to room temperature, temper rolling of less than 1% may be performed.

Advantageous Effects

According to the present disclosure, a high-strength steel sheet exhibiting high hole expandability of 25% or more and an elongation of 7% to 14%, while supporting a high tensile strength of 1180 MPa or more, a yield strength of 740 MPa to 980 MPa, and a low yield ratio of 0.65 to 0.85 may be provided.

In addition, a galvanized steel sheet manufactured using the high-strength steel sheet of the present disclosure has an effect of exhibiting excellent weldability due to excellent liquid metal embrittlement (LME) resistance after zinc plating.

The various and beneficial advantages and effects of the present disclosure are not limited to the above, and will be more easily understood in the course of describing specific embodiments of the present disclosure.

BEST MODE FOR INVENTION

The terminology used herein is for reference only to specific embodiments and is not intended to limit the present disclosure. Singular forms as used herein also include plural forms unless obviously indicate otherwise.

As used in the disclosure, the meaning of "including" specifies a specific characteristics, regions, integers, steps, operations, elements and/or components, and do not exclude presence or addition of other specific characteristics, regions, integers, steps, operations, elements, components and/or groups.

Unless indicated otherwise, it is to be understood that all the terms used in the specification, including technical and scientific terms have the same meaning as those that are understood by those skilled in the art to which the present disclosure pertains. It must be understood that the terms defined by the dictionary are identical with the meanings within the context of the related art, and they should not be ideally or excessively formally defined unless the context clearly dictates otherwise.

Hereinafter, a high-strength steel sheet according to an aspect of the present disclosure is described in detail. In the present disclosure, it should be appreciated that the content of each element is represented by wt %, unless otherwise specified. In addition, the ratio of crystals or structure is based on the area unless otherwise indicated.

Hereinafter, a high-strength steel sheet according to an aspect of the present disclosure is described in detail. In the present disclosure, when expressing the content of each element, it is necessary to note that unless otherwise specified, it means weight %. In addition, the ratio of crystals or tissues is based on the area unless otherwise indicated.

First, a component system of the high-strength steel sheet according to an aspect of the present disclosure is described in detail.

A high-strength steel sheet according to an aspect of the present disclosure includes, by wt %, 0.12% to less than 0.17% of carbon (C), 0.3% to 0.8% of silicon (Si), 2.5% to 3.0% of manganese (Mn), 0.4% to 1.1% of chromium (Cr), 0.01% to 0.3% of aluminum (Al), 0.01% to 0.03% of niobium (Nb), 0.01% to 0.03% of titanium (Ti), 0.001% to 0.003% of boron (B), 0.04% or less of phosphorus (P), 0.01% or less of sulfur (S): 0.01% or less of nitrogen (N), and a balance of iron (Fe) and inevitable impurities, wherein the contents of C, Si, and Al satisfy mathematical equation (1) below.

$$[C]+([Si]+[Al])/5 \leq 0.35 \text{ wt } \% \quad \text{[Equation (1)]}$$

(Here, [C], [Si] and [Al] refer to the wt % of C, Si and Al, respectively.)

Carbon (C): 0.12% to less than 0.17%

Carbon (C) is a basic element that supports strength of steel through solid solution strengthening and precipitation strengthening. If the amount of C is less than 0.12%, it may be difficult to secure a tempered martensite fraction of 50% or more and it may be difficult to obtain a strength equivalent to a tensile strength (TS) of 1180 MPa class. Meanwhile, if the amount of C is 0.17% or more, it may be difficult to have high LME resistance, so if a spot welding condition is severe, cracks may occur due to penetration of molten Zn during a welding process. In addition, when the carbon content is high, arc weldability and laser weldability may be deteriorated, the risk of cracking in a welded portion due to low-temperature brittleness may increase, and it may be difficult to obtain a target hole expansion ratio value. Therefore, in the present disclosure, the content of C is preferably limited to 0.12% or more and less than 0.17%. A preferable lower limit of the C content may be 0.122%, and a more preferable lower limit of the C content may be 0.125%. A preferable upper limit of the C content may be 0.168%, and a more preferable upper limit of the C content may be 0.165%.

Silicon (Si): 0.3% to 0.8%

Silicon (Si) is a key element in transformation induced plasticity (TRIP) steel that increases the fraction and elongation of retained austenite by inhibiting precipitation of cementite in a bainite region. If Si is less than 0.3%, retained austenite rarely remains and elongation becomes too low. Meanwhile, if Si exceeds 0.8%, it is impossible to prevent deterioration of weld properties due to formation of LME cracks, and surface properties and plating properties of steel materials are deteriorated. Therefore, in the present disclosure, it is preferable to limit the Si content to 0.3% to 0.8%. A preferable lower limit of the Si content may be 0.35%, and a more preferable lower limit of the Si content may be 0.4%. A preferable upper limit of the Si content may be 0.78%, and a more preferable upper limit of the Si content may be 0.75%.

Manganese (Mn): 2.5% to 3.0%

In the present disclosure, the content of manganese (Mn) may be 2.5% to 3.0%. If the content of Mn is less than 2.5%, it may be difficult to secure strength. Meanwhile, if the content exceeds 3.0%, a bainite transformation rate is slowed and too much fresh martensite may be formed, making it difficult to obtain high hole expandability. In addition, if the content of Mn is high, a martensite formation start temperature is lowered, and a cooling end temperature required to obtain an initial martensite phase in an annealing water cooling step is too low. Therefore, in the present disclosure, it is preferable to limit the Mn content to 2.5% to 3.0%. A preferable lower limit of the Mn content may be 2.55%, and a more preferable lower limit of the Mn content may be 2.6%. A preferable upper limit of the Mn content may be 2.95%, and a more preferable upper limit of the Mn content may be 2.9%.

Chromium (Cr): 0.4% to 1.1%

In the present disclosure, the content of chromium (Cr) may be 0.4% to 1.1%. If the amount of Cr is less than 0.4%, it may be difficult to obtain a target tensile strength, and if the amount of Cr exceeds an upper limit of 1.1%, a transformation rate of bainite may be slow, making it difficult to obtain high hole expandability. Therefore, in the present disclosure, it is preferable to limit the content of Cr to 0.4% to 1.1%. A preferable lower limit of the Cr content may be 0.5%, and a more preferable lower limit of the Cr content may be 0.6%. A preferable upper limit of the Cr content may be 1.05%, and a more preferable upper limit of the Cr content may be 1.0%.

Aluminum (Al): 0.01% to 0.3%

In the present disclosure, the content of aluminum (Al) may be 0.01% to 0.3%. If the amount of Al is less than 0.01%, deoxidation of the steel may not be sufficiently performed and cleanliness is impaired. Meanwhile, if Al is added in excess of 0.3%, castability of the steel is impaired. Therefore, in the present disclosure, it is preferable to limit the content of Al to 0.01% to 0.3%. A preferable lower limit of the Al content may be 0.015%, and a more preferable lower limit of the Al content may be 0.02%. A preferable upper limit of the Al content may be 0.28%, and a more preferable upper limit of the Al content may be 0.25%.

Niobium (Nb): 0.01% to 0.03%

In the present disclosure, 0.01% to 0.03% of niobium (Nb) may be added to increase the strength and hole expandability of the steel through crystal grain refinement and precipitate formation. If the Nb content is less than 0.01%, the effect of refining the structure may be lost and the amount of precipitation strengthening may be insufficient. Meanwhile, if the Nb content is more than 0.03%, the castability of the steel deteriorates. Therefore, in the present disclosure, it is preferable to limit the content of Nb to 0.01% to 0.03%. A preferable lower limit of the Nb content may be 0.012%, and a more preferable lower limit of the Nb content may be 0.014%. A preferable upper limit of the Nb content may be 0.025%, and a more preferable upper limit of the Nb content may be 0.023%.

Titanium (Ti): 0.01% to 0.03%, boron (B): 0.001% to 0.003%

In the present disclosure, 0.01% to 0.03% of titanium (Ti) and 0.001 to 0.003% of boron (B) may be added to increase the hardenability of the steel. If the Ti content is less than 0.01%, B may be combined with N and the hardenability strengthening effect of B may be lost, and if Ti is contained in more than 0.03%, the castability of the steel deteriorates. Meanwhile, if the B content is less than 0.001%, an effective hardenability strengthening effect cannot be obtained, and if the B content is more than 0.003%, boron carbide may be formed, which may rather impair hardenability. Therefore, in the present disclosure, it is preferable to limit the Ti content to 0.01% to 0.03% and the B content to 0.001% to 0.003%.

Phosphorus (P): 0.04% or less

Phosphorus (P) exists as an impurity in steel, and it is advantageous to control a content thereof as low as possible, but P may be intentionally added to increase the strength of steel. However, an excessive addition of P may deteriorate the toughness of the steel, and thus, in the present disclosure, it is preferable to limit an upper limit of P to 0.04% to prevent the deterioration of the toughness.

Sulfur (S): 0.01% or less

Sulfur (S) is present as an impurity in steel like P, and it is advantageous to control a content thereof to be as low as possible. In addition, since S deteriorates ductility and impact properties of the steel, it is preferable to limit an upper limit of S to 0.01% or less.

Nitrogen (N): 0.01% or less

In the present disclosure, nitrogen (N) is added to the steel as an impurity, and an upper limit of N is limited to 0.01% or less.

In addition to the contents of C, Si and Al as described above, C, Si and Al may satisfy the following Equation (1).

$$[C] + ([Si] + [Al])/5 \leq 0.35 \text{ wt } \% \quad \text{[Equation (1)]}$$

(Here, [C], [Si], and [Al] refer to wt % of C, Si, and Al, respectively.)

Liquid metal embrittlement (LME) of plated steel sheet occurs as plated zinc turns into a liquid during spot welding and the liquid zinc penetrates into an austenite grain boundary as tensile stress is formed at an austenite grain interface of the steel sheet. Since this LME phenomenon is particularly severe in the steel sheet to which Si and Al are added, the added amount of Si and Al is controlled through Equation (1) in the present disclosure. In addition, when the C content is high, an A3 temperature of the steel is lowered and an austenite region vulnerable to LME is expanded and toughness of the material is weakened, and thus, the added amount of Si and Al is controlled through Equation (1).

When the value of Equation (1) exceeds 0.35%, the LME resistance during spot welding deteriorates as described above, so that LME cracks exist after the spot welding, thereby impairing fatigue characteristics and structural safety. Meanwhile, as the value of Equation (1) is smaller, the spot weldability and LME resistance are improved, so a lower limit thereof may not be separately set. However, If the value is less than 0.20, it may be difficult to obtain high tensile strength of 1180 MPa class with excellent hole expandability, even though the spot weldability and LME resistance are improved. In some cases, a lower limit of the value may be limited to 0.20%.

The high-strength steel sheet according to an aspect of the present disclosure may further include one or more of 0.1 wt % of Cu, 0.1 wt % or less of Ni, 0.3 wt % or less of Mo, and 0.05 wt % or less of V, in addition to the aforementioned alloy components.

Copper (Cu): 0.1% or less, Nickel (Ni): 0.1% or less, Molybdenum (Mo): 0.3% or less Copper (Cu), nickel (Ni), and molybdenum (Mo) are elements increasing the strength of steel and are included as optional components in the present disclosure. Upper limits of the addition of these elements are limited to 0.1%, 0.1%, and 0.3%, respectively. These elements increase the strength and hardenability of steel, but an excessive amount of addition thereof may exceed a target strength grade, and in addition, cu, Ni, and Mo are expensive elements, an upper limit of the addition thereof may be limited to 0.1% or 0.3%. Meanwhile, since the Cu, Ni, and Mo act as solid solution strengthening elements, an addition thereof in an amount of less than 0.03% may render the solid solution strengthening effect insignificant, and therefore, a lower limit thereof may be limited to 0.03% or more.

Vanadium (V): 0.03% or less

Vanadium (V) is an element increasing the yield strength of steel through precipitation hardening, and may be selectively added to increase the yield strength in the present disclosure. However, an excessive content thereof may significantly reduce the elongation and may cause brittleness of the steel, so an upper limit of V is limited to 0.03% or less in the present disclosure. Meanwhile, since V causes precipitation hardening, even a small amount of addition thereof is effective. However, if V is added in an amount less than 0.005%, the effect may be insignificant, and thus, a lower limit of V may be limited to 0.005% or more.

In the present disclosure, in addition to the steel composition described above, the remainder may include Fe and unavoidable impurities. Inevitable impurities may be unintentionally mixed in a typical steel manufacturing process, so the inevitable impurities may not be completely excluded as those skilled in the art of the ordinary steel manufacturing field may easily understand the meaning. In addition, the present disclosure does not entirely exclude an addition of a composition other than the steel composition mentioned above.

Meanwhile, the high-strength steel sheet according to an aspect of the present disclosure satisfying the steel composition described above may have a microstructure including, by area fraction, more than 50% to 70% or less of tempered martensite and remaining retained austenite, fresh martensite, ferrite and bainite, The phases other than the tempered martensite may include, by area fraction, more than 1% to 4% or less of the retained austenite, more than 10% to 20% or less of the fresh martensite, an more than 0% to 5% or less of the ferrite, and a balance of bainite. In addition, 1% or more to 3% or less of a cementite phase as a second phase, by an area fraction, may be precipitated and distributed between the bainite laths or at the laths or grain boundaries of the tempered martensite phase.

Because the tempered martensite phase has a fine internal structure, the tempered martensite phase is an advantageous steel structure for securing the hole expandability of steel. If the fraction of tempered martensite is less than 50 area %, it may be difficult to obtain the target hole expandability. If the amount of tempered martensite is insufficient, the amount of phase transformation before a final cooling stage is insufficient and fresh martensite is excessively formed, finally impairing the elongation and the hole expandability of the steel. Meanwhile, when the tempered martensite exceeds 70 area %, the yield ratio and yield strength of the steel exceed the upper limit of the present disclosure, making it difficult to form the steel and causing problems such as springback after forming.

Meanwhile, the remaining structures other than the tempered martensite may include retained austenite, fresh martensite, ferrite, and bainite.

In the high-strength steel sheet according to the present disclosure, the upper limits of Si and Al are limited by Equation (1), but since Si and Al are added to a certain extent, retained austenite may exist at a level of more than 1 area % and 4 area % or less. However, a high fraction of retained austenite is not distributed as in typical TRIP steels with very high Si and Al contents.

In the present disclosure, in order to obtain a low yield ratio, fresh martensite structure is introduced at a level of more than 10 area % to 20 area % or less. When an austenite phase fraction is high after secondary cooling and reheating are finished, the carbon content in the austenite is low, resulting in insufficient stability, and a portion of the austenite is transformed into fresh martensite in a subsequent cooling process, thereby lowering the yield ratio.

In addition, although the ferrite structure in the present disclosure is bad for hole expandability, it may exist at a level of more than 0 area % to 5 area % or less during the manufacturing process. In addition, the microstructure of the present disclosure may include bainite.

In the high-strength steel sheet according to an aspect of the present disclosure, partial cementite is precipitated and grown in the microstructure by limiting the contents of Si and Al to suppress cementite growth to stabilize austenite according to the conditions of Equation (1). This cementite is precipitated at martensite lath or grain boundaries when martensite formed by secondary cooling is reheated, or is formed in a portion in which carbon is concentrated between bainitic ferrite laths when bainite transformation occurs during reheating after secondary cooling.

In the high-strength steel sheet according to the present disclosure, cementite at a level of 1% or more is precipitated by area fraction by limiting the upper limits of Si and Al by Equation (1), but nevertheless, due to the presence of partial Si and Al, austenite remains and since carbon is distributed inside the retained austenite, the amount of cementite precipitation is less than 3 area %.

Meanwhile, in the micro Vickers hardness test with a maximum load of 100 g or less, a difference between a 25%-th hardness value and a 75%-th hardness value may be distributed in the range of 100 to 150. A method for obtaining the difference between the hardness values is not specifically limited, but as a non-limiting example, after the micro-hardness 100 is measured, times or more with a load of 100 g or less of the maximum load on the microstructure, the measured hardness values may be listed in the order of hardness sizes, and the difference between the 75%-th and 25%-th hardness values may be obtained and calculated. If the difference in hardness value is less than 100, higher hole expandability may be expected, but the yield strength is increased and may exceed 980 MPa. Meanwhile, when the difference between the hardness values is greater than 150, the yield strength is lower than a level desired in the present disclosure and it is difficult to expect high hole expandability.

Having the above component composition and microstructure, the high-strength steel sheet of the present disclosure may exhibit a high hole expandability of 25% or more even at a tensile strength of 1180 MPa or more, a yield strength of 740 MPa to 980 MPa, and a low yield ratio of 0.65 to 0.85.

As described above, the low yield ratio of the high-strength steel sheet according to the present disclosure is due to the introduction of fresh martensite, and the inventors of the present application found that the hole expandability of 25% or more can be obtained even in the presence of fresh martensite under the alloy composition and structure control conditions according to the present disclosure.

In addition, since the high-strength steel sheet according to the present disclosure limits the contents of Si and Al, a TRIP effect is weak and a 7% or more and 14% or less of elongation may be obtained.

The high-strength steel sheet according to the present disclosure may be a cold-rolled steel sheet.

A hot-dip galvanized layer by a hot-dip galvanizing method may be formed on at least one surface of the high-strength steel sheet according to the present disclosure. In the present disclosure, a configuration of the hot-dip galvanized layer is not particularly limited, and any hot-dip galvanized layer commonly applied in the art may be preferably applied to the present disclosure. In addition, the hot-dip galvanized layer may be an alloying hot-dip galvanized layer alloyed with some alloy components of the steel sheet.

Next, a method for manufacturing a high-strength steel sheet according to another aspect of the present disclosure is described in detail.

The high-strength steel sheet according to an aspect of the present disclosure may be manufactured through sequential processes of preparing a steel slab satisfying the aforementioned steel composition and Equation (1), slab reheating, hot rolling, coiling, cold rolling, continuous annealing, primary and secondary cooling, and reheating, and details thereof are as follows.

First, a slab having the aforementioned alloy composition and satisfying Equation (1) is prepared and reheated to a temperature of 1150° C. to 1250° C. Here, if the slab temperature is lower than 1150° C., it is impossible to perform a next step, hot rolling, meanwhile, if the slab temperature exceeds 1250° C., a lot of energy is unnecessarily consumed to increase the slab temperature. Therefore, it is preferable to limit the heating temperature to a temperature of 1150° C. to 1250° C.

The reheated slab is hot-rolled to a thickness suitable for an intended purpose under the condition that a finish delivery temperature (FDT) is 900° C. to 980° C. If the FDT is lower than 900° C., a rolling load may be large and a shape defect may increase to deteriorate productivity. Meanwhile, when the FDT exceeds 980° C., surface quality is deteriorated due to an increase in oxides due to an excessively high temperature operation. Therefore, it is preferable to perform hot rolling under the condition that the FDT is 900 to 980° C.

After hot rolling, the slab is cooled to the coiling temperature at an average cooling rate of 10° C. to 100° C./see, and coiling is performed in a temperature range of 500° C. to 700° C. Then, after coiling, cold rolling is performed at a cold rolling reduction of 30% to 60% to obtain a cold rolled steel sheet.

If the cold rolling reduction ratio is less than 30%, it may be difficult to secure a target thickness precision, as well as difficult to correct a shape of the steel sheet. Meanwhile, if the cold rolling reduction ratio exceeds 60%, a possibility of cracks occurring in an edge portion of the steel sheet may increase and a cold rolling load becomes excessively large. Therefore, it is preferable to limit the cold rolling reduction in the cold rolling stage to 30% to 60%.

The cold rolled steel sheet is continuously annealed in a temperature range of (Ac3+30° C. to Ac3+80° C.) (hereinafter also referred to as 'SS' or 'continuous annealing temperature'). The continuous annealing operation is to form austenite close to 100% by heating to the austenite single-phase region and use it for subsequent phase transformation. If the continuous annealing temperature is less than Ac3+30° C., sufficient austenite transformation may not be achieved, which may lead to a failure of desired martensite and bainite fractions after annealing. Meanwhile, if the continuous annealing temperature exceeds Ac3+80° C., the productivity may be lowered and coarse austenite may be formed to deteriorate the material, and in addition, oxides grow during annealing to make it difficult to secure surface quality of a plating material.

In the case of actual manufacturing, if there are circumstances such as difficulty in knowing the Ac3 temperature of the steel sheet being manufactured, continuous annealing may be performed in the temperature range of 830° C. to 880° C. In addition, the continuous annealing may be performed in a continuous alloying hot-dip plating continuous furnace.

The continuously annealed steel sheet is first cooled at an average cooling rate of 10° C./s or less to a primary cooling end temperature of 560° C. to 700° C. (hereinafter also referred to as 'SCS') and is secondarily cooled at an average cooling rate of 10° C./s or more to a secondary cooling end temperature of 280° C. to 380° C. (hereinafter also referred to as 'RCS') to introduce martensite into the microstructure of the steel sheet. Here, the primary cooling end temperature may be defined as a time point at which a quenching facility not applied in the primary cooling is additionally applied and rapid cooling is started. When the cooling process is divided into primary and secondary cooling and executed by stages, a temperature distribution of the steel sheet may be uniform in a slow cooling stage to reduce a final temperature and material deviation a required phase composition may be advantageously obtained.

Primary cooling may be slow cooling at an average cooling rate of 10° C./s or less, and the cooling end temperature may be in a temperature range of 560° C. to 700° C. If the primary cooling end temperature is lower than 560° C., a ferrite phase is excessively precipitated to deteriorate a final hole expandability, and if the primary cooling end temperature exceeds 700° C., an excessive load is applied to the secondary cooling, so that a sheet-threading speed of the continuous annealing line should be slowed, thereby reducing productivity.

In the secondary cooling, a quenching facility not applied in the primary cooling may be additionally applied, and as a preferable embodiment, a hydrogen quenching facility using $H_2$ gas may be used, but is not limited thereto.

Here, it is important to control the cooling end temperature of the secondary cooling to 280° C. to 380° C. at which an appropriate initial martensite fraction may be obtained. If the cooling end temperature of the secondary cooling is lower than 280° C., the initial martensite fraction transformed during secondary cooling is too high, so there is no space to obtain various phase transformations required in a subsequent process, and the shape and workability of the steel sheet are deteriorated. Meanwhile, if the secondary cooling end temperature exceeds 380° C., it may be difficult to obtain high hole expandability due to the low initial martensite fraction.

The cooled steel sheet is reheated at a temperature increase rate of 5° C./s or lower up to a temperature range of 380° C. to 480° C. (hereinafter, also referred to as 'annealing reheating temperature' or 'RHS') to temper the martensite obtained in the previous stage, and bainite transformation is induced and carbon is concentrated in untransformed austenite adjacent to bainite.

Here, it is important to control the reheating temperature to 380° C. to 480° C. If the reheating temperature is lower than 380° C. or exceeds 480° C., the amount of phase transformation of bainite is small and too much fresh martensite is formed in a final cooling process, significantly impairing elongation and hole expandability.

If necessary, hot-dip galvanizing may be performed on the reheated steel sheet in a temperature range of 480° C. to 540° C. to form a hot-dip galvanized layer on at least one surface of the steel sheet.

In addition, if necessary, in order to obtain an alloyed hot-dip galvanized layer, after hot-dip galvanizing treatment, alloying heat treatment may be performed, and then cooling to room temperature may be performed.

In addition, after cooling to room temperature in order to correct the shape of the steel sheet and adjust the yield strength, a process of performing temper rolling of less than 1% may be further performed.

Mode for Invention

Hereinafter, the present disclosure is described in more detail through examples. However, it should be noted that the following examples are for illustrative purposes only and are not intended to limit the scope of the present disclosure. This is because the scope of the present disclosure is determined by matters described in the claims and matters able to be reasonably inferred therefrom.

Example

First, five types of steel sheets A to E satisfying the component systems shown in Table 1 were prepared. In addition, for each example, results of measuring materials and phase fractions according to a thickness of the steel sheet, FDT, CT (hot rolling coiling temperature) process conditions and continuous alloying hot-dip plating annealing conditions, i.e., continuous annealing temperature (SS), primary cooling end temperature (SCS), second cooling end temperature (RCS), and annealing reheating temperature (RHS) are shown in Table 2 and Table 3. A cooling rate after finish rolling, a cold reduction rate, and a temperature increase rate during reheating after cooling, which are not separately indicated in Table 2 below, were all controlled within the range satisfying the conditions of the present disclosure. In addition, the Ac3 temperature of each example was calculated using Thermocalc, a commercial thermodynamic software.

The method for measuring a material and a phase fraction applied in this example is as follows.

In this example, tensile strength (TS), yield strength (YS), and elongation (EL) of this example were measured through a tensile test in a direction perpendicular to rolling, and a specimen standard in which a gauge length was 50 mm and a width of a tensile specimen was 25 mm was used.

Hole expandability was measured according to the ISO 16330 standard, and a hole was sheared with a clearance of 12% using a 10 mm diameter punch.

A phase fraction of each Example was measured by a point counting method from a scanning electron microscope (SEM) photograph, but A fraction of retained austenite was measured by XRD. Also, the rest other than the phases listed in Table 3 are bainite.

As for a difference in hardness in each example, microhardness were measured 100 times or more with a load of 1 gf for each specimen, the measured hardness values were listed in the order of hardness sizes, and then a difference between the hardness values corresponding to 75%-th hardness value and 25%-th hardness value was obtained. This hardness difference value represents a hardness difference between phases in the entire microstructure, and when the hardness difference between phases is low, the possibility of obtaining high hole expandability increases.

TABLE 1

| Steel grade | Alloy composition (wt %) C | Si | Mn | Cr | Al | Ti | B | P | S | Cu | Ni | Mo | Nb | V | N | Equation 1 C + (Si + Al)/5 | Ac 3 temperature (° C.) |
|---|---|---|---|---|---|---|---|---|---|---|---|---|---|---|---|---|---|
| A | 0.103 | 0.569 | 2.38 | 0.87 | 0.075 | 0.020 | 0.0018 | 0.006 | 0.001 | 0.03 | 0.01 | 0.05 | 0.021 | 0.002 | 0.003 | 0.23 | 815 |
| B | 0.125 | 0.72 | 2.36 | 0.83 | 0.021 | 0.018 | 0.0011 | 0.005 | 0.002 | 0.02 | 0.00 | 0.00 | 0.017 | 0.001 | 0.003 | 0.27 | 807 |
| C | 0.146 | 0.513 | 2.9 | 0.97 | 0.088 | 0.024 | 0.0022 | 0.007 | 0.003 | 0.01 | 0.00 | 0.01 | 0.016 | 0.001 | 0.004 | 0.27 | 789 |
| D | 0.162 | 0.51 | 2.78 | 0.735 | 0.065 | 0.024 | 0.0019 | 0.006 | 0.002 | 0.03 | 0.01 | 0.00 | 0.014 | 0.001 | 0.003 | 0.28 | 787 |
| E | 0.215 | 0.85 | 3.21 | 0.91 | 0.031 | 0.021 | 0.0017 | 0.005 | 0.003 | 0.01 | 0.00 | 0.01 | 0.021 | 0.001 | 0.003 | 0.39 | 768 |

TABLE 2

| Classification | Steel grade | Hot-rolling thickness (mm) | FDT (° C.) | CT (° C.) | Cold rolling thickness (mm) | SS (° C.) | Average cooling rate of primary cooling (° C./s) | SCS (° C.) | Average cooling rate of secondary cooling (° C./s) | RCS (° C.) | RHS (° C.) |
|---|---|---|---|---|---|---|---|---|---|---|---|
| Comparative Exampe 1 | A | 2.4 | 946 | 605 | 1.5 | 833 | 3.3 | 643 | 18.0 | 332 | 422 |
| Comparative Example 2 | B | 2.5 | 938 | 598 | 1.6 | 852 | 3.8 | 621 | 17.6 | 297 | 447 |
| Inventive Example 1 | C | 2.5 | 952 | 611 | 1.6 | 832 | 4.0 | 598 | 16.1 | 301 | 442 |

TABLE 2-continued

| Classification | Steel grade | Hot-rolling thickness (mm) | FDT (° C.) | CT (° C.) | Cold rolling thickness (mm) | SS (° C.) | Average cooling rate of primary cooling (° C./s) | SCS (° C.) | Average cooling rate of secondary cooling (° C./s) | RCS (° C.) | RHS (° C.) |
|---|---|---|---|---|---|---|---|---|---|---|---|
| Inventive Example 2 | C | 2.2 | 944 | 588 | 1.4 | 821 | 4.2 | 611 | 12.9 | 318 | 432 |
| Inventive Example 3 | D | 2.1 | 932 | 572 | 1.3 | 822 | 3.3 | 633 | 14.8 | 305 | 428 |
| Comparative Example 3 | D | 2.5 | 951 | 611 | 1.6 | 851 | 3.5 | 612 | 12.7 | 362 | 446 |
| Comparative Example 4 | E | 2.3 | 941 | 621 | 1.4 | 837 | 3.4 | 622 | 17.4 | 302 | 438 |

TABLE 3

| Classification | Steel grade | YS (MPa) | TS (MPa) | El (%) | YR | HER (%) | Fraction of tempered martensite (%) | Fraction of cementite (%) | Fraction of retainer austenite (%) | Fraction of fresh martensite (%) | Fraction of ferrite (%) | 75%thHV – 25%thHV* |
|---|---|---|---|---|---|---|---|---|---|---|---|---|
| Comparative Example1 | A | 791 | 1057 | 12.5 | 0.75 | 56 | 56 | 1 | 2 | 5 | 27 | 135 |
| Comparative Example2 | B | 1062 | 1172 | 10.9 | 0.91 | 53 | 75 | 1 | 2 | 6 | 4 | 90 |
| Inventive Example1 | C | 912 | 1210 | 10.9 | 0.75 | 35 | 68 | 2 | 3 | 14 | 2 | 121 |
| Inventive Example2 | C | 852 | 1240 | 10.0 | 0.69 | 29 | 65 | 1 | 3 | 18 | 1 | 133 |
| Inventive Example3 | D | 921 | 1205 | 9.6 | 0.76 | 31 | 69 | 1 | 4 | 18 | 2 | 118 |
| Comparative Example3 | D | 732 | 1312 | 9.6 | 0.56 | 18 | 37 | 1 | 2 | 37 | 2 | 175 |
| Comparative Example4 | E | 963 | 1232 | 9.6 | 0.78 | 22 | 56 | 2 | 6 | 11 | 1 | 142 |

*75%thHV – 25%thHV: difference between 25%-th hardness value and 75%-th hardness value when micro Vickers hardness test was performed.

First, Comparative Examples 1 and 2 are cases in which steel grades A and B are applied, respectively. Steel grades A and B have the content of carbon (C) or manganese (Mn) lower than the range of the present disclosure, and strength of 1180 MPa class based on tensile strength (TS) was not obtained. In addition, in the case of steel grade B, the difference between the 75%-th hardness value and the 25%-th Vickers hardness value was less than 100, so that a high hole expansion ratio (HER) value was obtained, but the yield strength and yield ratio exceeded the range of the present disclosure.

In addition, in Comparative Example 3, a tempered martensite fraction did not exceed 50 area % and a fresh martensite fraction exceeded 20 area %, so that the yield strength did not reach 740 MPa, the HER value was also low, and the difference between the 75%-th hardness value and the 25%-th Vickers hardness exceeded 150.

In the case of Comparative Example 4, the carbon (C) content of steel grade E exceeded the component range of the present disclosure, and thus, even though other conditions were satisfied, the HER value was obtained to be less than 25%.

In Inventive Examples 1 to 3, steel grades C and D satisfying the alloy composition of the present disclosure were applied and all process conditions were satisfied, in which an HER of 25% or more and an elongation suitable for working of 7% to 14% were obtained at a low yield ratio of 0.65 to 0.85.

While exemplary embodiments have been shown and described above, it will be apparent to those skilled in the art that modifications and variations could be made without departing from the scope of the present disclosure as defined by the appended claims.

The invention claimed is:

1. A high-strength steel sheet comprising:

by weight percent (wt %), 0.12% to less than 0.17% of carbon (C), 0.3% to 0.8% of silicon (Si), 2.5% to 3.0% of manganese (Mn), 0.4% to 1.1% of chromium (Cr), 0.01% to 0.3% of aluminum (Al), 0.01% to 0.03% of niobium (Nb), 0.01% to 0.03% of titanium (Ti), 0.001% to 0.003% of boron (B), 0.04% or less of phosphorus (P), 0.01% or less of sulfur (S): 0.01% or less of nitrogen (N), and a balance of iron (Fe) and inevitable impurities, wherein the contents of C, Si, and Al satisfy mathematical equation (1) below, a microstructure of the high-strength steel sheet includes, by area fraction, more than 50% to 70% or less of tempered martensite and remaining retained austenite, fresh martensite, ferrite and bainite, and wherein a cementite phase as a second phase is precipitated and distributed in an area fraction of 1% or more and 3% or less between the bainite laths or at the laths or grain boundaries of the tempered martensite phase, $$[C] + ([Si] + [Al])/5 \leq 0.35 \text{ wt. \%} \quad \text{[Equation (1)]}$$

wherein [C], [Si] and [Al] refer to the wt % of C, Si and Al, respectively.

2. The high-strength steel sheet of claim 1, wherein the high-strength steel sheet includes more than 1% and less than 4% of the retained austenite, more than 10% and less than 20% of the fresh martensite, and more than 0% of the ferrite to less than 5%, and the balance is bainite.

3. The high-strength steel sheet of claim 1, wherein, when the micro Vickers hardness test is performed, a difference between a 25%-th hardness value and a 75%-th hardness value may be distributed in a range between 100 and 150.

4. The high-strength steel sheet of claim 1, wherein the steel sheet further includes, by wt %, one or more of 0.1% or less of copper (Cu), 0.1% or less of nitrogen (Ni), 0.3% or less of molybdenum (Mo), and 0.03% or less of vanadium (V).

5. The high-strength steel sheet of claim 1, wherein the steel sheet has a tensile strength of 1180 MPa or more, a yield strength of 740 MPa to 980 MPa, a yield ratio of 0.65 to 0.85, a hole expansion ratio (HER) of 25% or more, and an elongation of 7 to 14%.

6. The high-strength steel sheet of claim 1, wherein the steel sheet is a cold rolled steel sheet.

7. The high-strength steel sheet of claim 1, wherein a hot-dip galvanized layer is formed on at least one surface of the steel sheet.

8. The high-strength steel sheet of claim 1, wherein an alloying hot-dip galvanized layer is formed on at least one surface of the steel sheet.

9. A method of manufacturing a high-strength steel sheet of claim 1, the method comprising:

preparing a slab comprising, by wt % ,0.12% to less than 0.17% of carbon (C), 0.3% to 0.8% of silicon (Si), 2.5% to 3.0% of manganese (Mn), 0.4% to 1.1% of chromium (Cr), 0.01% to 0.3% of aluminum (Al), 0.01% to 0.03% of niobium (Nb), 0.01% to 0.03% of titanium (Ti), 0.001% to 0.003% of boron (B), 0.04% or less of phosphorus (P), 0.01% or less of sulfur (S): 0.01% or less of nitrogen (N), and a balance of iron (Fe) and inevitable impurities, wherein the contents of C, Si, and Al satisfy Equation 1 below;

heating the slab to a temperature range of 1150° C. to 1250° C.;

finish hot rolling the heated slab within a temperature range of finish delivery temperature (FDT) of 900° C. to 980° C. to obtain a hot rolled steel sheet;

cooling the hot rolled steel sheet at an average cooling rate of 10° C./sec to 100° C./sec to obtain a cooled steel sheet;

coiling the cooled steel sheet in a temperature range of 500° C. to 700° C.;

cold rolling the coiled steel sheet at a cold-rolling reduction ratio of 30% to 60% to obtain a cold rolled steel sheet;

continuously annealing the cold rolled steel sheet in a temperature range of (Ac3+30° C.~Ac3+80° C.);

primarily cooling the continuously annealed steel sheet at an average cooling rate of 10° C./s or less to a temperature range of 500° C. to 700° C. and secondarily cooling the primarily cooled steel sheet at an average cooling rate of 10° C./s or more to a temperature range of 280° C. to 380° C.; and reheating the secondarily cooled steel sheet at a temperature increase rate of 5° C./s or less to a temperature range of 380° C. to 480° C., $$[C] + ([Si] + [Al])/5 \leq 0.35 \text{ wt \%} \quad \text{[Equation (1)]}$$

wherein [C], [Si] and [Al] refer to the wt % of C, Si and Al, respectively.

10. The method of claim 9, wherein the slab further includes, by wt %, 0.1% or less of copper (Cu), 0.1% or less of nickel (Ni), 0.3% or less of molybdenum (Mo), and 0.03% or less of vanadium (V).

11. The method of claim 9, further comprising performing hot dip galvanizing at a temperature range of 480° C. to 540° C., after the reheating.

12. The method of claim 11, wherein, after the performing of the hot-dip galvanizing, an alloying heat treatment is performed and a cooling is subsequently performed to room temperature.

13. The method of claim 11, wherein, after the cooling to room temperature, a temper rolling of less than 1% is performed.

* * * * *